(12) United States Patent
Forsberg

(10) Patent No.: US 6,722,491 B2
(45) Date of Patent: Apr. 20, 2004

(54) FEEDER TUBE FOR BULK PRODUCT

(75) Inventor: Göran Forsberg, Karlstad (SE)

(73) Assignee: Main Engineering Aktiebolag, Karlstad (SE)

(*) Notice: Subject to any disclaimer, the term of this patent is extended or adjusted under 35 U.S.C. 154(b) by 14 days.

(21) Appl. No.: 10/141,581

(22) Filed: May 9, 2002

(65) Prior Publication Data

US 2002/0170804 A1 Nov. 21, 2002

Related U.S. Application Data

(60) Provisional application No. 60/289,530, filed on May 9, 2001.

(51) Int. Cl.[7] .......................... B65G 33/00; B65G 33/12
(52) U.S. Cl. ...................... 198/658; 198/657; 198/670; 198/671
(58) Field of Search ................................. 198/657, 658, 198/662, 670, 671, 675, 676

(56) References Cited

U.S. PATENT DOCUMENTS

| 3,788,446 A | * | 1/1974 | Postel-Vinay | ............... | 198/658 |
|---|---|---|---|---|---|
| 4,266,902 A | * | 5/1981 | Forsberg | ..................... | 198/671 |
| 4,351,627 A | * | 9/1982 | Forsberg | ..................... | 198/658 |
| 4,393,609 A | * | 7/1983 | Persson | ..................... | 198/671 |
| 4,511,066 A | * | 4/1985 | Forsberg | ..................... | 198/671 |
| 5,709,296 A | * | 1/1998 | Forsberg | ..................... | 198/658 |
| 6,193,053 B1 | * | 2/2001 | Gaalswyk | ................... | 198/662 |

* cited by examiner

*Primary Examiner*—Gene O Crawford
(74) *Attorney, Agent, or Firm*—Birch, Stewart, Kolasch & Birch, LLP

(57) ABSTRACT

A feeder tube for bulk product, including a tube in which there are inlet openings distributed along the length of the tube. A screw conveyer is disposed axially within the tube. The tube rotates about its axis, the screw conveyer rotates relative to the tube and the feeder tube moves in the lateral direction. Activators form projections on the outer side of the tube and are disposed on the tube near the inlet openings. In each cross-section along at least 40% of the length of the tube, there are at least two inlet openings. At least two activators are also positioned in each cross-section. For a feeder tube having a desired average volumetric capacity (V') the slot width (d) of the majority of the openings is $V'{\sim}d^n$, wherein n is between 2–3. The total sum of the width ($\Sigma d$) of all openings in each-section is between 150–700 mm.

30 Claims, 10 Drawing Sheets

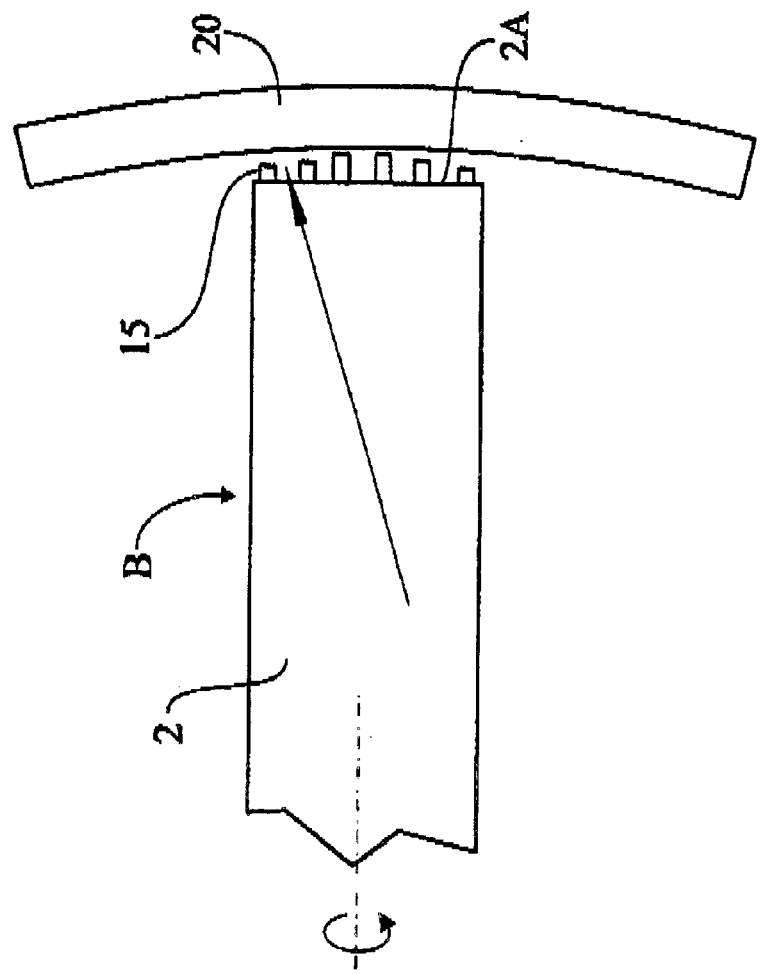
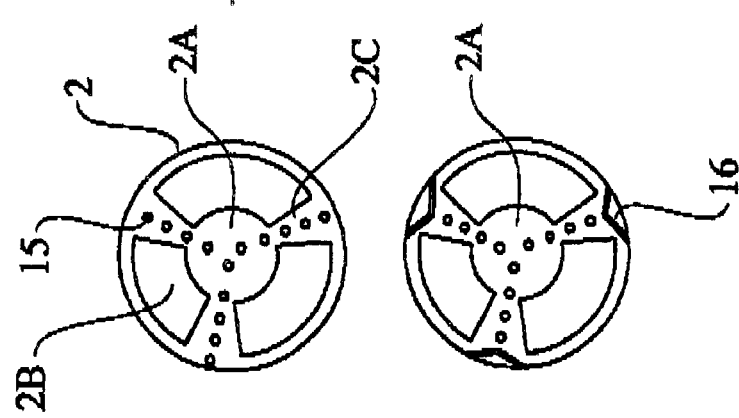
Fig. 15
Fig. 16
Fig. 17

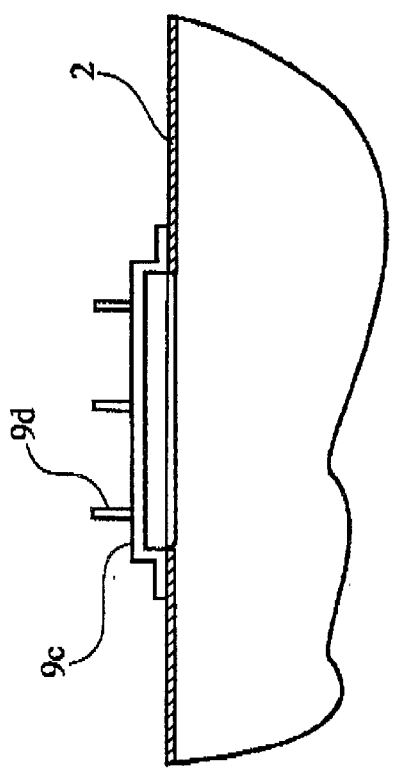
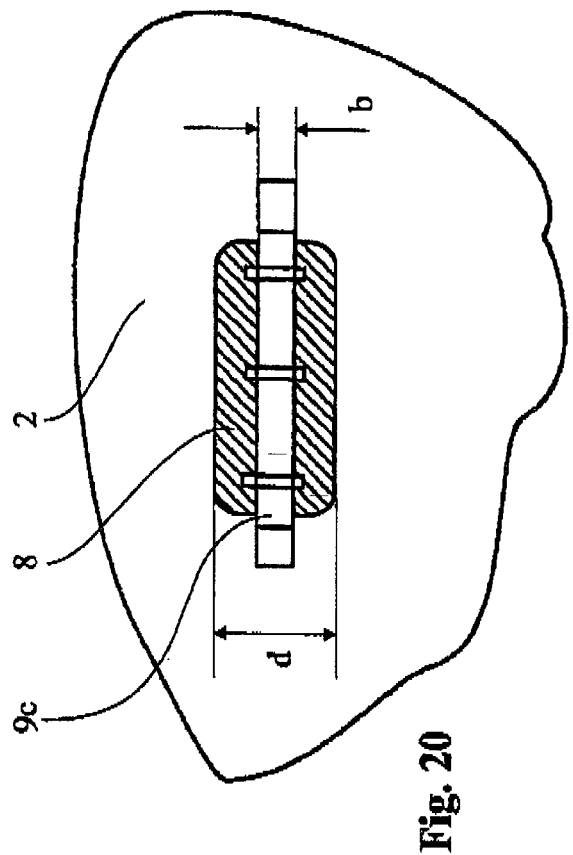
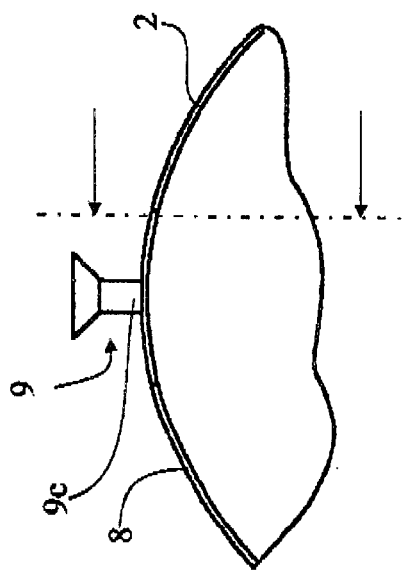
Fig. 19
Fig. 20
Fig. 18

FEEDER TUBE FOR BULK PRODUCT

This application claims the benefit of Provisional Application No. 60/289,530, filed May 9, 2001.

TECHNICAL FIELD

This invention relates to a feeder tube, for bulk products, which comprises a cylindrical drum or tube in which there are accommodated a large number of inlet openings distributed along the length of the tube, a screw conveyer disposed coaxially within the tube, a first arrangement for rotating the tube about its axis, a second arrangement for rotating the screw conveyer relative to the tube, a third arrangement for moving the feeder tube in the lateral direction, and activators for the bulk product, which activators form projections on the outer side of the tube and are disposed on the tube in association with said inlet openings.

BACKGROUND OF THE INVENTION

Feeder tubes of the above stated kind are previously known and commonly used. Example of such feeder tubes are described in Swedish Patent Applications 7611862-9, 8004499-8 and in EP-751904. This kind of feeder tube, requires an extremely low amount of power input (compared to other kind of prior art feeder tubes) to the feed-out of bulk, from a buffer storage vessel, e.g. as a silo. In some known installations it has happened that jamming has occurred after shut down, which is believed to be caused by uncontrolled flow through the tube inlet openings, and flow of bulk material through the tube and thereby causing jamming of the screw conveyer.

Another disadvantage with the known kind of design is that the maximum lateral velocity of tube, within the pile of bulk products in the silo, is rather limited. A velocity exceeding 30 mm/min is mostly not feasibly, because the bulk material then acts as a barrier making it impossible to move faster even if the lateral force is drastically increased. It is evident that if the limit velocity is reached and the lateral force is increased further, this could result in undesirably high stress within some parts of the feeder tube, e.g. leading to premature wear and failure.

It has been believed that this limited lateral velocity is a kind of implicit feature of the design related to the extremely low power consumption. Accordingly it has been believed that if the velocity would be increased this could only be achieved at the price of drastically increased energy consumption. Indeed tests have been performed which imply that changes such as increasing the rotational speed of the tube and/or increasing the width of the slots have not improved the performance of the feeder tube without drastic negative consequences.

BRIEF DESCRIPTION OF THE INVENTION

Now it has been found that considerable improvements of the performance of a feeder tube of this specific kind may be achieved by providing a feeder tube characterized in that in each cross section along at least 40% of the length of the tube, preferably at least 70%, more preferred at least 90%, there are disposed at least two inlet openings. Thanks to this arrangements the feeder tube may be moved through the bulk product at considerably higher speed than is known from prior art. Furthermore this also leads to minimised risk of jamming after shut down.

According to further aspects of the invention;

there are disposed at least three inlet openings in each of said cross sections, said tube feeder is designed for feeding bulk products of wood chips, and/or fibrous material and/or powder, said bulk product having an average size with a maximum extension/width (X) and wherein the width (d) of each slot is 1,5–30 x, preferably 3–10 x and more preferred 4–8 x, in each of said cross section said openings are disposed along the circumference of the tube such that the bending resistance of said tube in said cross section is the same irrespective of which diametrical centreline (y) is chosen within said cross section, i.e. the number openings being 3 or 4 or any multiple of 3 or 4, the diameter of said tube is between 200–1500 mm, more preferred 500–1000 mm and most preferred 600–900 mm, said activators are detachably arranged on said tube, the total length of said tube is between 3–30 m, more preferred 4–25 m and most preferred 10–18 m, said first arrangement for rotating the tube about its axis provides for a rotational speed of the tube of 0–20 rpm, preferably 0,5–15 rpm and more preferred 1–8 rpm, in a portion comprising at least 30% of the length of the tube the total sum of the width ($\Sigma d$) of all openings in each cross-section is between 150–700 mm, preferably at least 250 mm, more preferred at least 350 mm, a detachably arranged cover device is positioned to cover a part of at least one of said openings such that the width (d) of said opening may be adjusted, at least one of said activators, preferably the majority of said activators, comprises at least one discrete protruding element, preferably a number of discrete protruding elements acting as an agitator.

said tube is arranged with a number of discrete protruding elements which are positioned at a distance in relation to said inlet openings.

said activator comprises plate like structure that extends across the opening at a distance from each lengthwise extending edge of the opening in a direction substantially parallel to the extension of the tube, wherein the width (b) of said plate like structure is substantially smaller than slot width (d) of said opening, such that preferably 10 mm<2b<d.

BRIEF DESCRIPTION OF THE DRAWINGS

In the following the invention will be described in more detail in relation to the attached drawings, in which;

FIG. 15 shows an alternate embodiment of a feeder tube which moves laterally by rotation FIG. 16 is an end view of an alternate feeder tube as shown in FIG. 15, and FIG. 17 shows a further alternate embodiment of an end of a feeder tube, and FIG. 18 shows a further alternate embodiment in a similar view as FIG. 12, FIG. 19 shows a cross-sectional view along the indication of FIG. 18, and FIG. 20 shows a view from above of FIG. 18.

DETAILED DESCRIPTION

Figure 1:
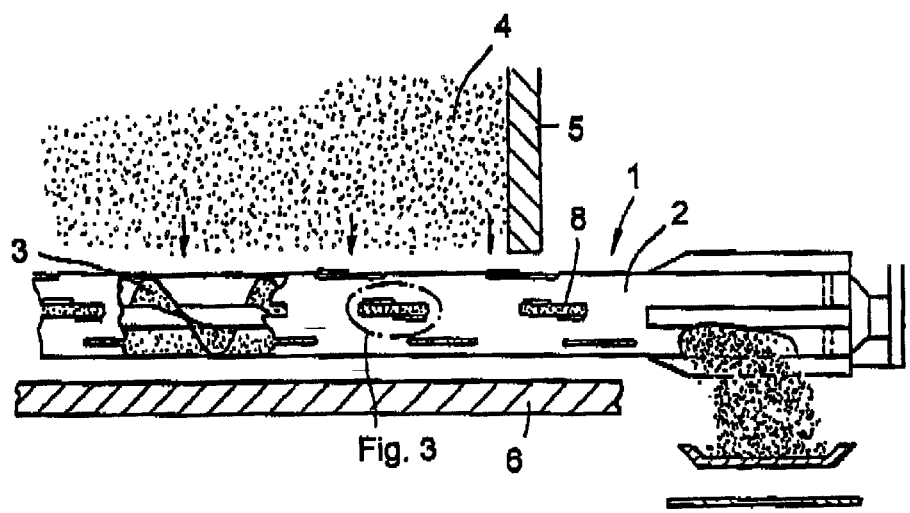
FIG. 1 shows a first embodiment of a feeder tube arrangement which may be used in connection with the invention.

With reference first to FIG. 1, a feeder tube having a known basic construction is denoted in general by the reference numeral 1. The arrangement comprises a cylindrical tube 2 and a screw conveyer 3 disposed coaxially within the tube 2. Further, there is one motor for rotating the tube 2 about its axis, another motor for rotating the screw conveyor 3 relative to the tube and a so-called "traversing gear" for moving the entire feeder tube in the lateral direction. This lateral displacement can be effected directly at right-angels to the axis of the feeder tube 1 or about a centre of rotation, i.e. along an arc-shaped direction of travel. A silo for bulk product 4 is denoted by 5 and the bottom of the silo is denoted by 6.

Figure 2:
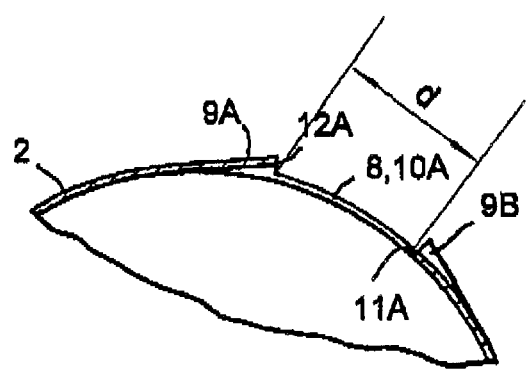
FIG. 2 shows a cross sectional view of a feeder tube according to FIG. 1, along II—II in FIG. 3.
Figure 3:
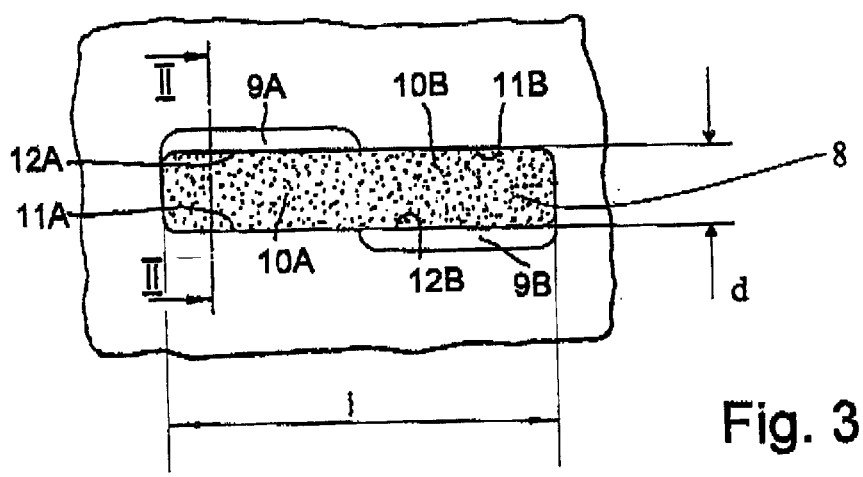
FIG. 3 is a detailed front view of a slot/opening of FIG. 1.

The feeder tube shown in FIG. 1 is primarily intended for difficult-to-handle and/or fibrous material, e.g. fuel consisting of forest products, particularly so-called "crushed forest fuel", in which occasional larger fragments can occur and/or in which material is easily entwined such that bridging can easily arise. In order to prevent such bridges and in order also to be able to handle occasional larger, often longer fragments, the tube 2, along its length, according to prior art has been provided with a number of helically distributed inlet openings 8, which are relatively few and relatively large. FIGS. 2 and 3 illustrate in greater detail how such an inlet opening 8 may be arranged. The length 1 can measure up to 500 mm, whilst the width d can measure up to 300 mm. Along the one longitudinal side, the hole edge is designed along half its length as a first activator 9A in the form of a projection of the tube wall at the hole edge. On the opposite side and within the second half of the hole edge there is a second activator 9B. The two activators 9A and 9B are thus disposed diagonally relative to each other and accommodate each half of the longitudinal side of the inlet opening 8. As a result of this geometry, there is always, regardless of the direction of rotation of the tube 2, a portion 10A or 10B, i.e. the one or the other half of the inlet opening 8, which is limited in the direction of rotation by a slot edge 11A or 11B, which has no activator, and by a hole edge 12A or 12B, which is provided with an activator 9A or 9B.

Figure 4:
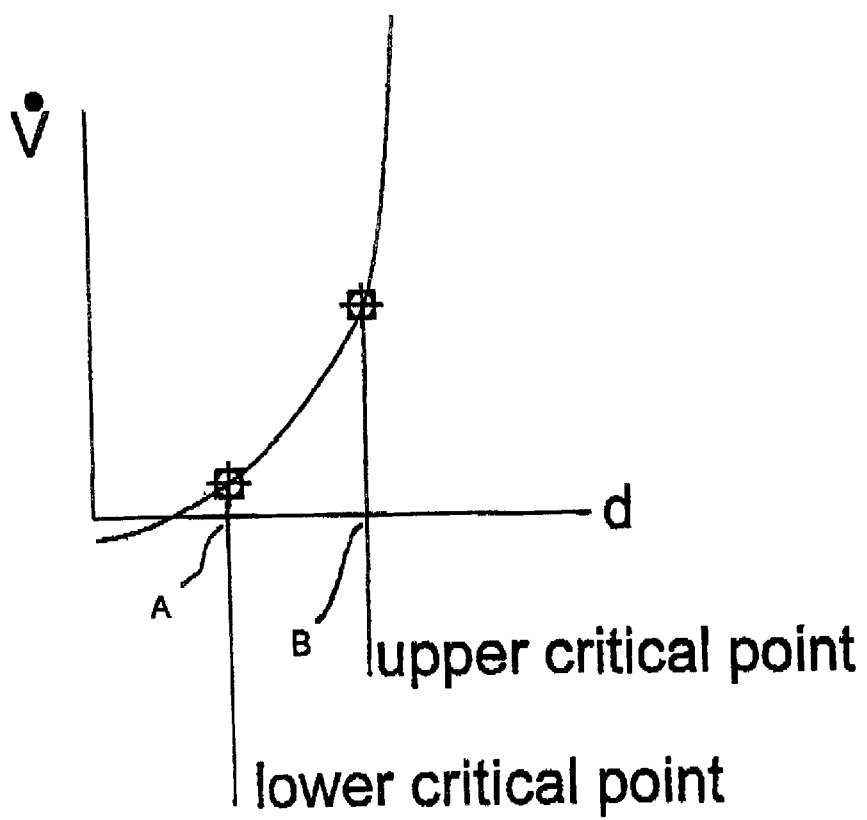
FIG. 4 shows a graph representing the capacity in relation to slot width.

In FIG. 4 there is shown a graph representing the capacity of flow (V') through a tube 2 having a certain slot width d. As can be noted the reclaim rate is not linear in relation to the slot width d. In relation to the length l of the opening 8, however, the reclaim rate is linear, i.e. V'=kl. Practical experience carried out with a tube feeder according to basic design of the feeder tube shows that the flow capacity V' is exponential, in relation to slot width d, wherein V'=$kd^n$+L, where d is slot width, and K and L are constants depending on bulk material. Tests have shown that the exponent n preferably should be between 2–3, depending on bulk material, i.e. V'~$d^n$. Accordingly, the reclaim rate increases drastically above a critical point. If this critical point is passed there is no possibility to control the flow rate, which will lead to over loading the feeder tube. Accordingly, the size of the slot width d should be kept securely below this critical point. In the graph this maximum slot width is represented by a first vertical line B. A second vertical line A presents a lower limit for the slot width d, in order to achieve a sufficient flow through the tube.

As a first consequence of the above findings it has been established tat according to a preferred design model there should be at least two inlet openings 8 and at least two actively positioned activators in each cross section along a substantial portion of the tube 2. Thanks to this novel arrangement the tube feeder may more securely be controlled and also it may be moved with a considerably higher lateral speed through the bulk product, without any notable increase of power consumption.

According to further test that have been carried out it has been found that the slot width advantageously may be related to the maximum extension X of an averaged sized specimen of the bulk product that is to be conveyed. Preferably the slot width d is between 3–10 x, more preferred 4–8 x.

Figure 5:
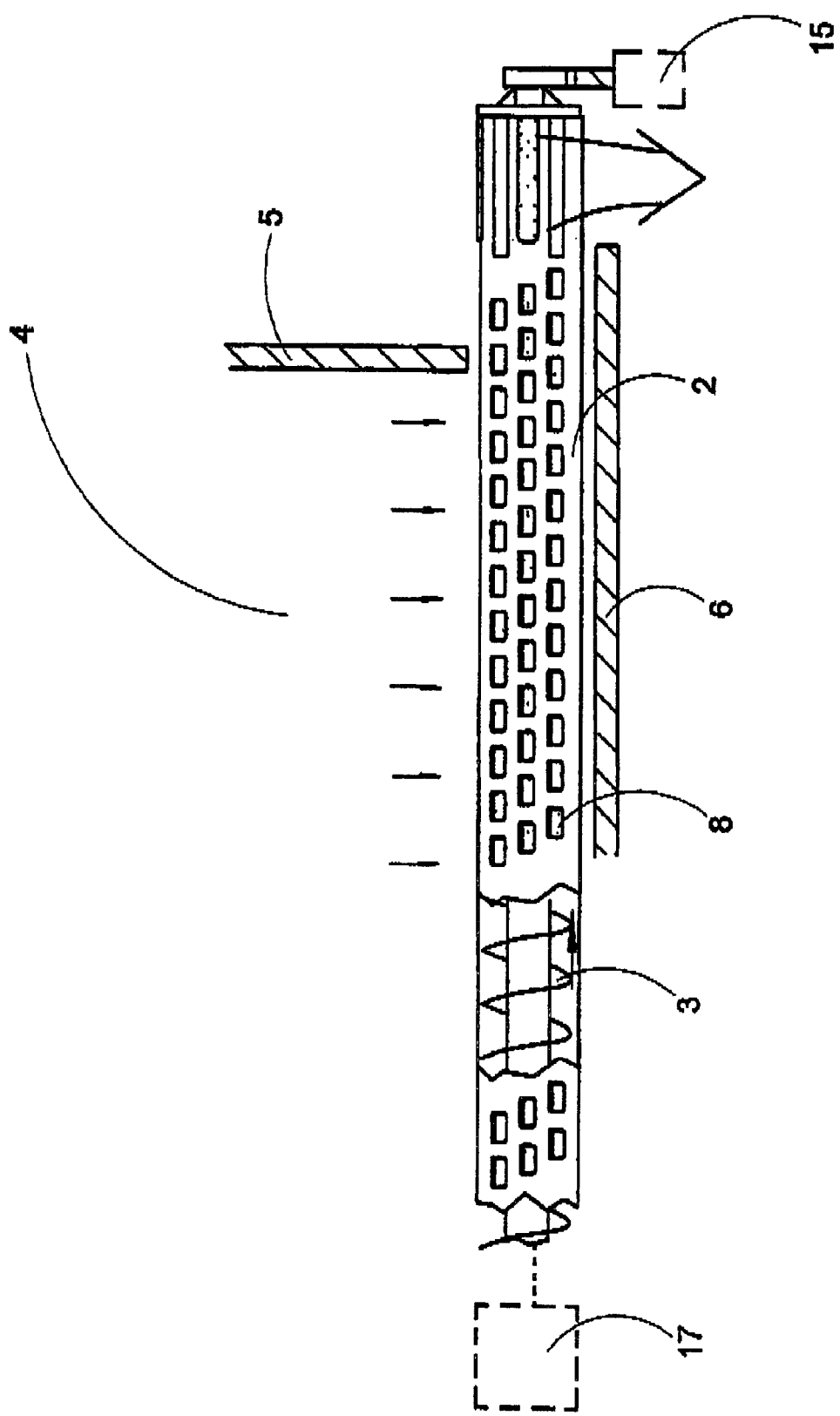
FIG. 5 shows a feeder tube according to a preferred embodiment of the invention.

In FIG. 5 there is shown a feeder tube 1 according to the invention. There is shown a first drive 15 for driving the tube 2 and a second drive 17 for rotating the screw conveyer 3. The feeder tube is positioned in a silo 4 having wall parts 5 and bottom 6. The preferred size of the tube 2 is 500–1000 mm (diameter). The preferred length of the tube is 4–25 m. The rotational speed of the tube should be kept within 0–20 rpm, preferably 0,5–15 rpm.

Figure 6:
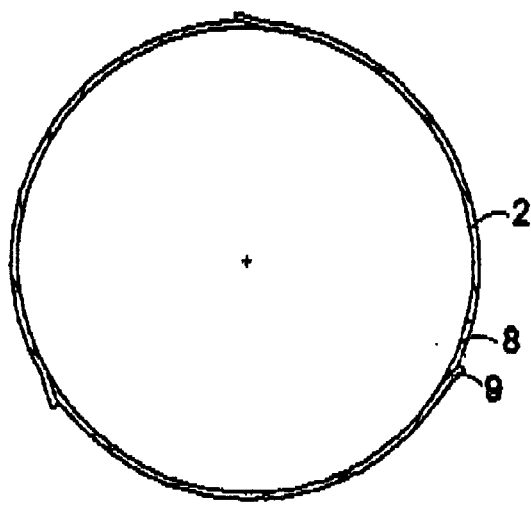
FIG. 6 shows a cross section of a tube of FIG. 5.

In FIG. 6 there is shown a cross section of a tube 2 in FIG. 5. As can be seen there are arranged three openings 8 and also three active activators 9 when rotating the tube 2 according to the indicated direction of rotation. Furthermore the design of FIG. 6 presents the advantage of having the openings 8 disposed along the circumference of the tube such that the bending resistance of said tube is the same irrespective of which diametrical centreline Y is chosen within said cross section. The advantages of this feature is possible when using three or four or any multiple of three or four openings in each cross section.

A tube feeder according to the novel design provides many advantages. Thanks to the optimised slot width d there will be created a material bridge over each opening 8 when the tube feeder is not in operation and accordingly covered as a consequence of shut down operation of the conveyer. Thanks to the design, the bulk material is evenly distributed along the entire length of the tube, which provides for an optimised operation of the conveyer and an optimised flow of the bulk product through the feeder tube. Furthermore the screw inside the tube is protected from the surrounding material pressure, which eliminates shear forces in the material, leads to low power requirement/material pressure and provides for small forces in screw operation and no travelling forces. All in all it provides for a very secure and energy efficient system of conveying bulk product.

Figure 7:
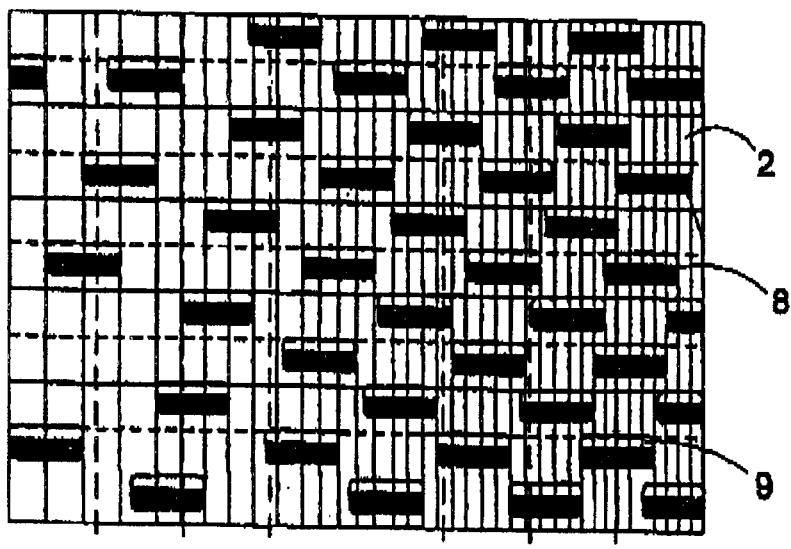
FIG. 7 shows a fold-up of a modified embodiment of a tube according to the invention.
Figure 7:
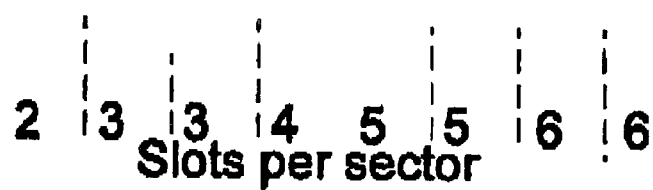

In FIG. 7 there is shown a fold-up of a modified design of the tube 2 according to the invention. As can be seen there are less openings at the left hand side of the tube 2 than at the right hand side thereof. This is due to the tube being intended for use in connection with a feeder tube wherein the lateral displacement is achieved by rotating the tube about a centre of rotation. The left hand side being positioned closer to the centre of rotation. Accordingly the right hand side, where the speed is higher, the tube 2 will move at a higher lateral speed through the bulk product than the left hand side. Hence the larger number of openings at the right hand side of the tube provides for a larger capacity of flow, i.e. the maximal volumetric flow capacity at a position far away from the centre of rotation is greater than near the centre of rotation.

Figure 8:
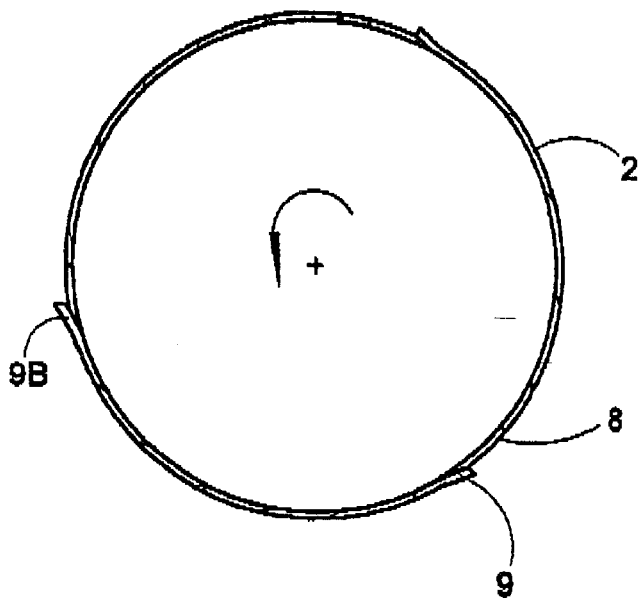
FIG. 8 shows a first modification of a cross section of a tube in FIG. 5.

In FIG. 8 there is shown a reversible tube 2 being equipped with three openings 8 and two active activators 9 in one direction as indicated in the figure and one active activator in the opposite direction.

Figure 9:
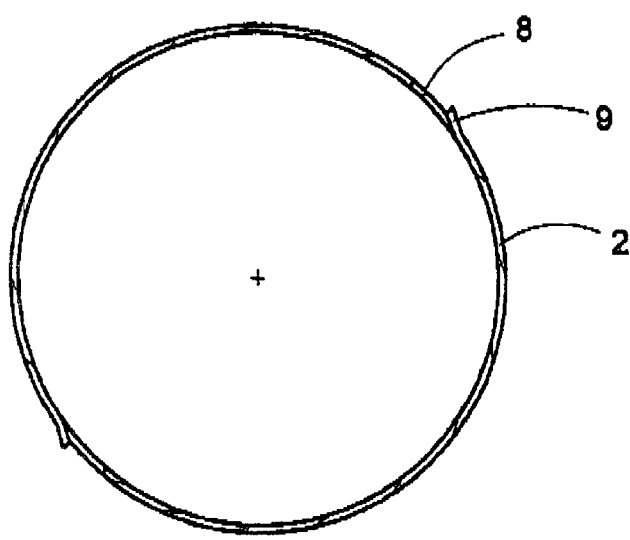
FIG. 9 shows a second modification of a cross section of a tube according to the invention.

In FIG. 9 there is shown a further modification according to the invention showing the use of two inlet openings 8 and two active activators 9.

Figure 10:
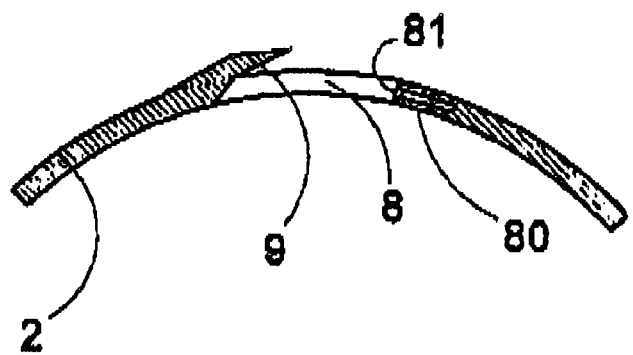
FIG. 10 shows a further modification of an opening of a tube according to the invention.
Figure 11:
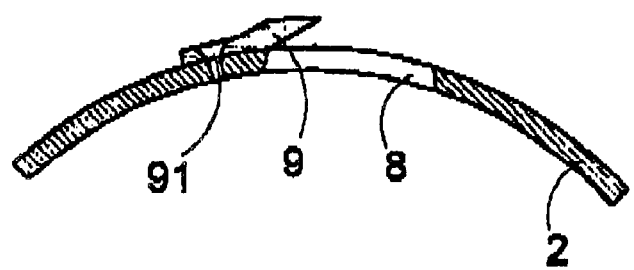
FIG. 11 shows another modification of an opening of a tube according to the invention.

In FIG. 10 there is shown a tube 2 having a detachably arranged cover device 80, (preferably fastened by means of screws 81) in order to provide for the possibility of adjusting the width d of the opening 8, either by taking it away or replacing it with a cover device 80 of another width, FIG. 11 presents that also the activator 9 may be detachably arranged, which is not merely advantageous if wear occurs but which also provides for the possibility of changing place for all activators 9 such that the direction of rotation may be altered.

Figure 12:
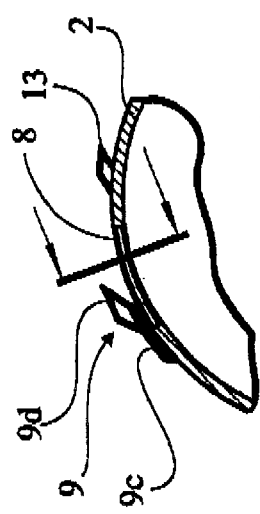
FIG. 12 shows a further modified embodiment of a feeder tube according to the invention, seen in a cross sectional view perpendicular to the extension of the tube.
Figure 13:
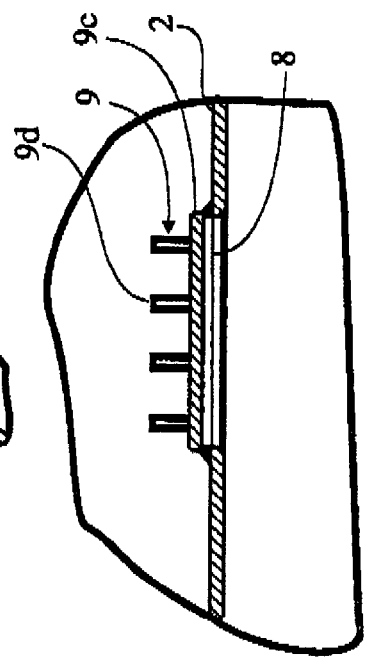
FIG. 13 is a cross sectional view as indicated in FIG. 12.

In FIGS. 12 and 13 there is shown a modified embodiment where the activators 9 consist of a plate like structure 9C on top of which there are positioned a number of discrete elements 9D. This kind of activator 9D, 9C will have the same kind of function as that kind of activator having a continues extension (see FIG. 3) in the axial direction of the tube. However, depending on the material an activator 9 having discrete elements 9D as shown in FIG. 13 or continues plate like elements may be preferred in one of the other situation. In a case where the bulk material is compact and/or interlaced there can exist cavities within the bulk material, which do not fall down against the tube, since the compact/bonded material around the cavity does not allow this. The bulk material which will be treated by the rotating tube, in such a situation, may obtain a kind of hardened surface, which may hinder the tube from advancing forward into the bulk material. By the use of discrete elements 9D as shown in FIG. 13 this kind of hardened surface may be eliminated. The length of these elements 9D may vary, also on the very same tube. Normally the extension in a radial direction is between 30–90 mm above the surface of the tube 2.

As shown in FIG. 12 the same kind of discrete details 9D may also be positioned at a distance from the inlet hole 8, wherein these elements 13 will have a function as agitators 13. It is evident that this kind of agitators 13 may also be used in combination with an activator 9 having a continues extension as shown in for example FIG. 3.

Figure 14:
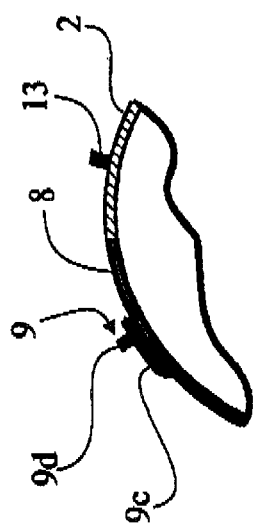
FIG. 14 shows a further alternate embodiment in a similar view as FIG. 12.

In FIG. 14 it is shown that the activator elements 9D as well as the agitators 13 may take the form of cylindrical elements. The elements may be attached in different manners depending on the situation, e.g. by welding or by threads.

In FIG. 15 it is schematically shown a tube 2 which on top of its rotation around its axis also is rotated in the horizontal direction, i,e. a lateral displacement about the centre of rotation at the middle of the extension of the tube 2. Accordingly the end 2A of the tube 2 will move close to the wall 20 of the storage vessel. In order to avoid material from getting stuck between the end 2A and the wall 20 it is shown that the end of the tube 2 is arranged with a number of agitators 15. These agitators may take any appropriate form in general, as described above.

In FIG. 16 there is shown an end view of the tube 2 in FIG. 15. As can be seen a number of agitator elements 15 are arranged onto the adjoining parts 2C of the end wall 2A of the tube 2. In this case there is shown an embodiment of the tube with three openings 2B at the end and where the agitators 15 are centrally positioned on each one of the adjoining/supporting elements extending from the centre to the periphery of the tube end 2A.

In FIG. 17 there is shown a similar design of the end 2A of a tube 2 as in FIG. 16. A difference is that at the periphery there are arranged, plates which will displace bulk material inwardly and radially while the tube rotates, such that bulk material will be forced into the openings 2B at the tube end 2A.

In FIGS. 18, 19 and 20 there is shown a further modified embodiment where the activators 9 consist of a plate like structure 9C which extends in the axial extension of the tube 2, and which bridges over the inlet opening 8. On top of the plate like structure 9C there are positioned a number of discrete elements 9D. These elements 9D are preferably formed symmetrically, such that the direction of rotation may be altered without the need of rearranging the elements 9D. Furthermore the plate like structure 9C is positioned across the centre of the opening 8, which also provides for the possibility of changing direction of rotation without any rearrangements being needed.

Figure 21:
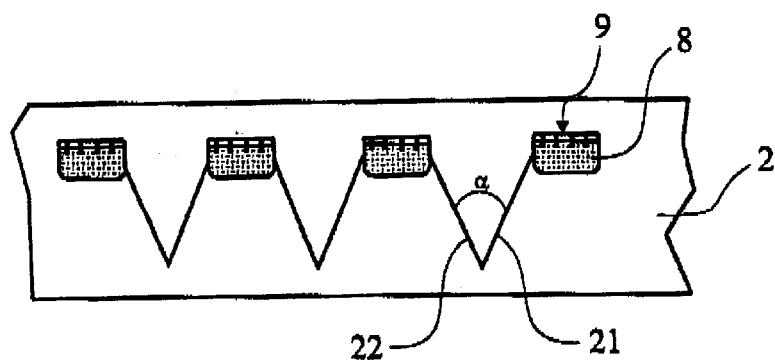
FIG. 21 shows a view from above of a tube of a modified embodiment.

In FIG. 21 there is shown a modified embodiment of a feeder tube 2 according to the invention. On the top surface of the tube 2 between two neighbouring openings 8 there are arranged two upwardly protruding ridges 21, 22. The front end of the ridges 21, 22 are joined at a distance from the openings in a direction corresponding to the direction of rotation of the tube 2. The other end of each ridge 21, 22 terminates at the side edge of each opening 8 respectively, such that a sharp angle α is formed between the two ridges 21, 22. The ridges 21, 22 will have a plough-like influence on the bulk material that is in contact with the tube 2, such that it will be forced sideways into the openings 8. An advantage of the plough-like form is that the lateral forces acting thereon will be equalised. It is evident for the skilled man that the angle α between the ridges may vary within wide ranges, e.g. 30–90°.

Figure 22:
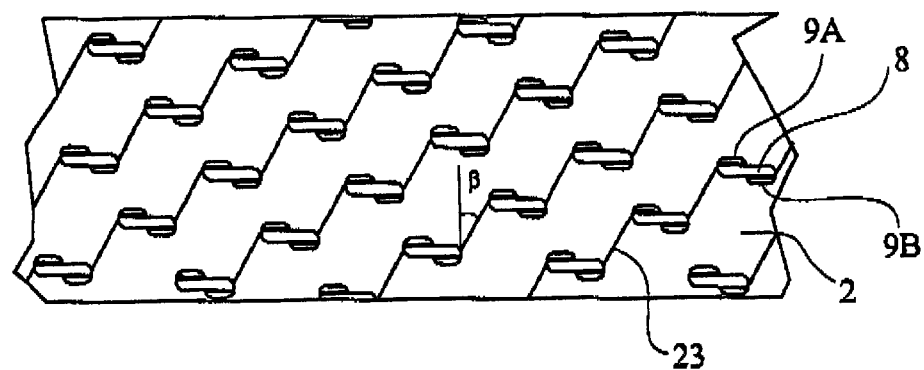
FIG. 22 shows a tube from above of a further modified embodiment.

In FIG. 22 there is shown a further embodiment according to the invention, where the tube 2 is arranged with the same kind of openings 8 and activators 9A, 9B as in FIG. 3 and wherein the openings 8 are more closely arranged than the openings 8 in FIG. 21.

Also in FIG. 22 there is shown the use of ridges 23 providing a similar function as the ridges 21, 22 in FIG. 21. In this case, however, the ridges 23 merely pushes the bulk material in one lateral direction, by extending from one side edge of an opening 8 to another side edge of an opening in front of it. Accordingly one ridge 23 extends from the left hand side edge of a first opening 8 to the right hand side edge of an opening being positioned laterally displaced and in front of the first opening. (Or vice versa if the lateral movement of the bulk material is intended in the other lateral direction). The extension of each ridge 23 forms an angle β in relation to a plane that is perpendicular in relation to the extensional tube 2. The angle β preferably varies within a range of about 10–50°.

Figure 23:
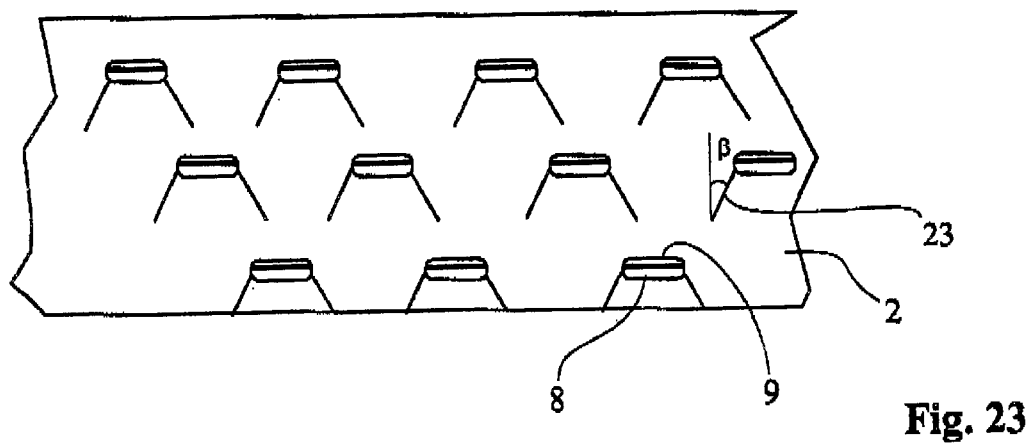
FIG. 23 shows a view from above of still a further embodiment according to the invention.

In FIG. 23 there is shown a further embodiment of how ridges 23 may be positioned in relation to the openings 8 of the tube 2. Each opening 8 has been provided with a pair ridges 23 which extend from each of its side edge in a sharp angle β (preferably within a range of about 10–50°) in relation to a plane being perpendicular in relation to the extension of the tube 2.

The invention is not limited to what is described above but may be varied within the scope of the claims, accordingly it is evident that more than two, three or even four slots may be used in order to optimise the flow capacity in the different situations. The activators may not be integral with the tube 2, but may be detachable, which provides for the advantage that the direction of rotation may be changed. The feeding rate may also be adjusted by varying individual activators and/or slot opening sizes in the feeder tube. A further evident embodiment which may be combined with the invention is to use an inner screw within the tube 2 that is lacking a shaft i.e. a screw without shaft. Especially when very long tubes are being used there may be problems with the bending of the shaft of the screw within the tube. In order to avoid problems due to the bending, the shaft has to be relatively thick. As a consequence the whole tube will have to made wider, which accordingly will lead to increased cost. In such a situation it may be advantages to use a screw without shaft. The inner surface of the tube 2 may be arranged with low friction lining to support the rotating periphery of a screw without shaft. By eliminating the shaft of the screw, substantially smaller dimensions may be used an accordingly also the tube may be made smaller, which substantially reduces the cost. Moreover it is evident that a variety of combinations of different above described configurations are obvious options for the skilled person, e.g. the use of agitators 13 in combination with any of the other tube designs shown or described, the use of agitators 15 at the end of the tube 2 in combination with any of the other tube designs shown or described, the use of ridges 21,22,23 in combination with any of the other tube designs shown in or described, etc. Furthermore it is evident that the extension of the openings and activators respectively, may be varied in relation to the extension of the take, i.e. not being totally parallel in relation to each other, e.g. using an angle of about 10–30° between the extension of tube 2 and the extension of the opening 8 and/or the activator 9.

What is claimed is:

1. Feeder tube for bulk product, wherein said feeder tube is designed for feeding bulk products of wood chips, and/or fibrous material and/or powder where bridging can easily arise, which feeder comprises a cylindrical drum or tube (2) in which there are accommodated a large number of inlet openings (8) distributed along the length of the tube, a screw conveyer (3) disposed coxially within the tube (2), a first arrangement for rotating the tube about its axis, a second arrangement for rotating the screw conveyer (3) relative to the tube (2), a third arrangement for moving the feeder tube (1) in the lateral direction, and activators (9A, 9B) for the bulk product, which activators form projections on the outer side of the tube (2) and are disposed on the tube in association with said inlet openings (8), wherein each cross section along at least 40% of the length of the tube (2), there are disposed at least two inlet openings (8), characterized in that openings (8), activators (9A,9B) and the rotational speed of the tube (2) are arranged to facilitate a lateral velocity of the feeder tube within a pile of bulk to substantially exceed 30 mm/min, wherein the rotational speed of the tube (2) is 0,5–15 rpm, at least two actively positioned activators (9A, 9B) are also positioned in each cross section and that for a feeder tube (1) having a desired average volumetric capacity (V') the slot width (d) of the majority of the openings (8) is chosen by means of $V' \sim d^n$, wherein n is between 2–3 depending on bulk material, in combination with that in a portion comprising at least 30% of the length of the tube (2) the total sum of the width (Σd) of all openings (8) in each cross-section is between 150–700 mm.

2. Feeder tube according to claim 1, characterized in that there are disposed at least three inlet openings (8) in each of said cross sections.

3. Feeder tube according to claim 1, characterized in that in each of said cross section said openings (8) are disposed along the circumference of the tube (2) such that the bending resistance of said tube (2) in said cross section is the same irrespective of which diametrical centreline (y) is chosen within said cross section, with the number openings being 3 or 4 or any multiple of 3 or 4.

4. Feeder tube according to claim 1, characterized in that said activators (9A, 9B) are detachably arranged on said tube (2).

5. Feeder tube according to claim 1, characterized in that said first arrangement for rotating the tube (2) about its axis provides for a rotational speed of the tube (2) of 1–8 rpm.

6. Feeder tube according to claim 1, characterized in that a detachably arranged cover device (80) is positioned to cover a part of at least one of said openings (8) such that the width (d) of said opening may be adjusted.

7. A feeder tube according to claim 1, wherein said cross-section is along at least 70% of the length of the tube.

8. A feeder tube according to claim 1, wherein said cross-section is along at least 90% of the length of the tube.

9. Feeder tube according to claim 1, characterized in that said bulk product having an average size with a maximum extension/width (X) and wherein the width (d) of each slot (8) is 1, 5–30 ×.

10. A feeder tube according to claim 9, wherein the width of each slot is 3–8 ×.

11. A feeder tube according to claim 9, wherein the width of each slot is 4–8×.

12. Feeder tube according to claim 1, characterized in that the diameter of said tube (2) is between 200–1500 mm.

13. A feeder tube according to claim 12, wherein the diameter of said tube is between 500–1000 mm.

14. A feeder tube according to claim 12, wherein the diameter of said tube is between 600–900 mm.

15. Feeder tube according to claim 1, characterized in that the total length of said tube (2) is between 3–30 m.

16. A feeder tube according to claim 15, wherein the total length of said tube is between 4 . 25 m.

17. A feeder tube according to claim 15, wherein the total length of said tube is between 10–18 m.

18. Feeder tube according to claim 1, characterized in that in a portion comprising at least 30% of the length of the tube (2) the total sum of the width (Σd) of all openings (8) in each cross-section is at least 250 mm.

19. A feeder tube according to claim 18, wherein the total sum is at least 350 mm.

20. Feeder tube according to claim 1, characterized in that at least one of said activators (9A, 9B), comprises at least one discrete protruding element (9D) acting as an agitator.

21. Feeder tube according to claim 1, or claim 20, characterized in that said tube (2) is arranged with a number of discrete protruding elements (13, 15) which are positioned at a distance in relation to said inlet openings (8).

22. Feeder tube according to claim 1 or 20, characterized in that said activator comprises plate like structure (3C) that extends across the opening (8) at a distance from each lengthwise extending edge of the opening (8) in a direction substantially parallel to the extension of the tube (2), wherein the width (b) of said plate like structure is substantially smaller than slot width (d) of said opening (8), such that 10 mm<2b<d.

23. A feeder tube according to claim 20, wherein the majority of said activators comprise at least one discrete protruding element.

24. A feeder tube according to claim 20, wherein at least one of said activators comprises a number of discrete protruding elements.

25. Feeder tube for bulk product, which comprises a cylindrical drum or tube (2) in which there are accommodated a large number of inlet openings (8) distributed along the length of the tube, a screw conveyer (3) disposed coaxiallly within the tube (2), a first arrangement for rotating the tube about its axis, a second arrangement for rotating the screw conveyer (3) relative to the tube (2), a third arrangement for moving the feeder tube (1) in the lateral direction, and activators (9A, 9B) for the bulk product, which activators form projections on the outer side of the tube (2) and are disposed on the tube in association with said inlet openings (8) characterized in that said tube (2) on its outer surface is arranged with a number of protruding elements (13; 21, 22; 23) which, at least partly are positioned at a distance in relation to said inlet openings (8).

26. Feeder tube according to claim 25, characterized in that said protruding elements comprise a number of discrete protruding elements (13; 15) acting as agitators.

27. Feeder tube according to claim 26, characterized in that protruding elements (15) acting as agitators are also positioned at the end (2A) of the tube.

28. Feeder tube according to claim 25 or 26, characterized in that said activator comprises plate like structure (3C) that extends across the opening (8) at a distance from each lengthwise extending edge of the opening (8) in a direction substantially parallel to the extension of the tube (2), wherein that the width (b) of said plate like structure is substantially smaller than slot width (d) of said opening (8), such that 10 mm<2b<d.

29. Feeder tube according to claim 25 or 26, characterized in that said protruding elements comprise ridge formed elements (21, 22, 23) to produce a lateral force on the bulk material being in contact with the tube.

30. Feeder tube according to claim 29, characterized in that said ridges (21, 22, 23) extend at an angle ($\beta$) which is between 10–50° in relation to a plane perpendicular to the extension of the tube (2).

* * * * *